(12) United States Patent
Moslehi et al.

(10) Patent No.: US 7,133,582 B1
(45) Date of Patent: Nov. 7, 2006

(54) FIBER-OPTIC FILTER WITH TUNABLE GRATING

(76) Inventors: Behzad Moslehi, 1778 Fordham way, Mountain View, CA (US) 94040; Marco A. Hernandez, 38003 Stenhammer Dr., Fremont, CA (US) 94536

( * ) Notice: Subject to any disclaimer, the term of this patent is extended or adjusted under 35 U.S.C. 154(b) by 84 days.

(21) Appl. No.: 10/728,009

(22) Filed: Dec. 4, 2003

(51) Int. Cl.
G02B 6/00 (2006.01)
G02B 6/34 (2006.01)
G02F 1/295 (2006.01)

(52) U.S. Cl. ............... 385/13; 385/6; 385/37
(58) Field of Classification Search .......... 385/13
See application file for complete search history.

(56) References Cited

U.S. PATENT DOCUMENTS

| | | | |
|---|---|---|---|
| 4,268,116 A | 5/1981 | Schmadel et al. |
| 4,622,663 A | 11/1986 | Ishikawa et al. |
| 4,986,623 A | 1/1991 | Sorin |
| 5,237,576 A | 8/1993 | DiGiovanni et al. |
| 5,357,097 A | 10/1994 | Shiozawa |
| 6,011,881 A | 1/2000 | Moslehi et al. |
| 6,275,629 B1 | 8/2001 | Eggleton et al. |
| 6,299,703 B1 * | 10/2001 | Chen et al. ............ 148/313 |
| 6,366,721 B1 | 4/2002 | Hu et al. |
| 6,411,746 B1 | 6/2002 | Chamberlain |
| 6,453,108 B1 | 9/2002 | Sirkis |
| 6,594,410 B1 | 7/2003 | Kersey et al. |
| 6,597,822 B1 | 7/2003 | Moslehi et al. |

OTHER PUBLICATIONS

Sorin & Shaw, "A Single Mode Fiber Evanescent Grating Reflector" Journal of Lightwave Technology LT-3: 1041-1045 (1985).
web page—TERFENOL-D http://www.extrema-usa.com/products/terfenol.
web page Magnetostriction http://www.extrema-usa.com/core.

* cited by examiner

Primary Examiner—Frank G. Font
Assistant Examiner—Michael P. Mooney
(74) Attorney, Agent, or Firm—Jay A. Chesavage; File-EE-Patents.com (57) ABSTRACT

A tunable optical fiber has a grating which is attached to an expander responsive to an external control including a temperature or a magnetic field. The expander changes length, and this is coupled to the optical fiber, which changes pitch, thereby accomplishing a tuning change. The expander may be coupled to the grating directly, or through an expansion reducer, which produces a greater range of tuning. Terfenol-D™ may be used for the expander material, and tubes which include a bonding point adjacent to the extents of the grating may form the extent reducers.

10 Claims, 5 Drawing Sheets

Figure 11
sections a–a and d–d

Figure 12
sections b–b and c–c

Figure 13

FIBER-OPTIC FILTER WITH TUNABLE GRATING

FIELD OF THE INVENTION

This invention relates to a fiber-optic tunable filter using a fiber Bragg grating (FBG) bonded to an expander having a coefficient of expansion for either temperature or magnetic field.

BACKGROUND OF THE INVENTION

Fiber optic filters are well known in the art, and may be constructed using a combination of optical fiber and gratings. Using fiber of the previously described type, there are several techniques for creating fiber optic gratings. The earliest type of fiber grating-based filters involved gratings external to the fiber core, which were placed in the vicinity of the cladding as described in the publication "A single mode fiber evanescent grating reflector" by Sorin and Shaw in the Journal of Lightwave Technology LT-3:1041–1045 (1985), and in the U.S. patents by Sorin U.S. Pat. No. 4,986,624, Schmadel U.S. Pat. No. 4,268,116, and Ishikawa U.S. Pat. No. 4,622,663. All of these disclose periodic gratings which operate in the evanescent cladding area proximal to the core of the fiber, yet maintain a separation from the core. A second class of filters involve internal gratings fabricated within the optical fiber itself. One technique involves the creation of an in-fiber grating through the introduction of modulations of core refractive index, wherein these modulations are placed along periodic spatial intervals for the duration of the filter. In-core fiber gratings were discovered by Hill et al and published as "Photosensitivity in optical fiber waveguides: Application to reflected filter fabrication" in Applied Physics Letters 32:647–649 (1978). These gratings were written internally by interfering two counter propagating electromagnetic waves within the fiber core, one of which was produced from reflection of the first from the fiber endface. However, in-core gratings remained a curiosity until the work of Meltz et al in the late 1980s, who showed how to write them externally by the split-interferometer method involving side-illumination of the fiber core by two interfering beams produced by a laser as described in the publication "Formation of Bragg gratings in optical fibers by a transverse holographic method" in Optics Letters 14:823–825 (1989). U.S. patents Digiovanm U.S. Pat. No. 5,237,576 and Glenn U.S. Pat. No. 5,048,913, also disclose Bragg gratings, a class of grating for which the grating structure comprises a periodic modulation of the index of refraction over the extent of the grating. Within this class of in-fiber gratings, most of the art is directed to in-fiber gratings having the Bragg plane of refractive index modulation perpendicular to the principal axis of the core of the fiber optic cable. A new class of grating involves in-fiber gratings with an angular offset in the plane of refractive index modulation. This type of angled grating is referred to as a mode-converting two-mode grating, and, with properly chosen angle, has the property of converting fundamental-mode power into second-mode power and visa versa. Whether internal or external, both types of gratings can be fabricated as short-period gratings, or long-period gratings. Short-period gratings reflect the filtered wavelength into a counter-propagating mode, and, for silica based optical fibers, have refractive index modulations with periodicity on the order of a third of the wavelength being filtered. Long-period gratings have this modulation period much longer than the filtered wavelength, and convert the energy of one mode into another mode propagating in the same direction, i.e., a co-propagating mode, as described in the publication "Efficient mode conversion in telecommunication fibre using externally written gratings" by Hill et al in Electronics Letters 26:1270–1272 (1990). The grating comprises a periodic variation in the index of refraction in the principal axis of the core of the fiber, such variation comprising a modulation on the order of 0.1% of the refractive index of the core, and having a period associated with either short or long-period gratings, as will be described later.

Figure 1:
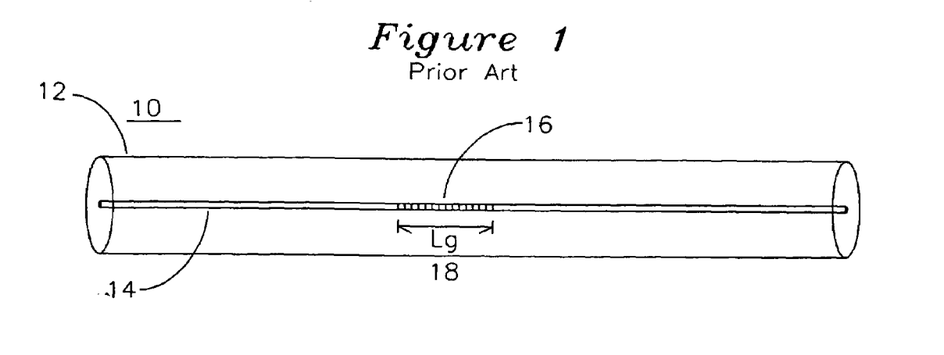
FIG. 1 shows a prior art optical fiber with a fiber Bragg grating.

Tunable fiber-optic filters can be produced in a variety of ways. FIG. 1 shows a fiber optic cable 12 having a core 14 which has a grating 16 written over an extent $L_g$ 18. The pitch of the grating 16 may be fixed or variable, and may be incrementally varied by changing the temperature of the fiber in the region of the grating. Germanium doped silicon has a coefficient of thermal expansion of 10 ppm/° C. Alternatively, the fiber may be placed in a variable tension, and this tension causes a shift in wavelength, as in the case of U.S. Pat. No. 6,597,822 by Moslehi et al. In U.S. Pat. No. 4,968,623 by Sorin, the pitch of a grating is varied by applying a proximal grating mounted on a disk and rotating it to vary the apparent pitch experienced by the proximal fiber. In U.S. Pat. No. 6,011,881 by Moslehi et al, a method for tuning a fiber optic grating coupled to a variable index material is disclosed. U.S. Pat. No. 6,411,746 by Chamberlain et al discloses a method for tuning an optical filter comprising grating coupled to a heater.

It is desired to provide a tunable fiber optic filter where the strain of a grating is varied through the expansion of an expander having a large extent which is coupled to the smaller extent of a Bragg grating. It is also desired to provide a magnetically tunable fiber-optic filter where the extent of an expander is the same as, or greater than, the extent of the fiber Bragg grating.

Figure 13:
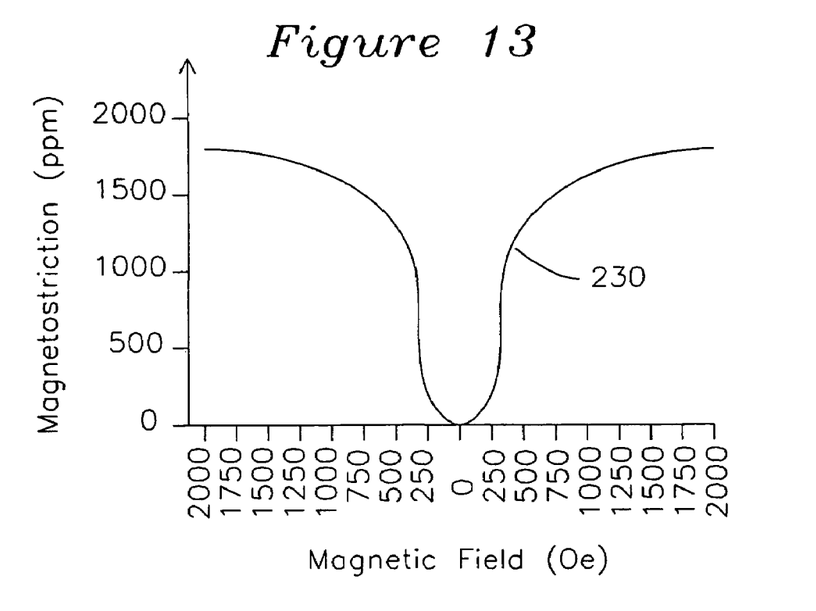
FIG. 13 is a graph of the magnetostrictive properties of Terfenol-D™.

There are many materials known for its magnetostrictive properties, and among these materials the material of choice is Terfenol™ (Terfenol is a registered trademark of Etrema Products www.etrema.com, and Terfenol™ information is available at www.etrema-usa.com). Other magnetostrictive materials which change length in response to an externally applied magnetic field are KelvinAll®, Terbium-Dysprosium, and Terbium-Dysprosium-Zinc. FIG. 13 shows the magnetostrictive property of $Tb_{0.3}$ $Dy_{0.7}$ $Fe_{1.9}$ which is commonly known by the tradename Terfenol-D™. Until recently, magnetostrictive materials typically produced lower strains than piezoceramic and electrostrictive materials. The graph 230 shows the magnetostriction of Terfonol-D varying from 0 to approximately 1800 ppm over the range 0 to 2000 Oersteds of magnetic field, which is on the order of 40 times greater magnetostriction than previous magnetostrictive materials, and a facter of 10 greater than piezoceramic devices. The graph 230 has a quadratic response for small fields (below 200 Oe), a quasi-linear response for fields from 200 Oe to 600 Oe, and a saturating region for fields in excess of 600 Oe. These points are approximate, and may vary depending on the particular material used.

OBJECTS OF THE INVENTION

A first object of the invention is a tunable filter whose transmission and reflection characteristic can be modified by the application of thermal energy to an expander made from a material having a coefficient of expansion which is greater or lesser than that of the fiber.

A second object of the invention is a tunable filter whose transmission and reflection characteristic may be modified by the application of magnetic field to an expander made from a material having a coefficient of expansion to a magnetic field.

A third object of the invention is a tunable filter where an expander is tightly coupled to a Bragg grating in a fiber where the grating extent is similar to the extent of the expander.

A fourth object of the invention is a tunable filter where an expander is coupled at to a fiber at two attachment areas, and the fiber has a Bragg grating positioned between these two attachment areas.

A fifth object of the invention is a tunable filter where an expander is coupled to an extent reducer at two attachment areas, and the fiber has a Bragg grating positioned between the extent of the extent reducer attachment areas.

A sixth object of the invention is a tunable filter where an expander fabricated from a first material is coupled to an extent reducer which reduces the extent of the expander to two attachment areas, and the fiber has a Bragg grating positioned between the attachment areas of the extent reducer, and the extent reducer is fabricated from a second material, where the first and second materials have substantially different coefficients of thermal expansion.

A seventh object of the invention is a tunable filter where an expander is constructed from several magnetostrictive rods having a first end and an opposite end, the rods including a central channel for the displacement of a fiber with a grating bonded to a first fiber rod on one side of the grating and a second fiber rod on the other side of the grating, the first rod extending to and bonded to the first expander end, and the second fiber rod extending to and bonded to the opposite expander end.

SUMMARY OF THE INVENTION

A fiber optic cable has a grating written in an area having an extent $L_g$, and this grating is mechanically coupled over the extent $L_g$ in tension to a structure known as an expander, which performs the function of modifying the tension in the fiber grating through the application of an external control parameter such as temperature or magnetic field which varies the length of the expander. The expander changes dimension in accordance with the coefficient of expansion of the expander. For the case of tuning the Bragg grating using temperature control, the expander is made from a material having a coefficient of thermal expansion greater than or opposite to the coefficient of thermal expansion of the fiber and a heat source is coupled to the expander, causing the grating period to change. For a tunable Bragg grating with magnetic control, the expander is made from a material having a coefficient of magnetic field expansion and a magnetic field is applied. For the temperature controlled tunable filter, a suitable material for the expander may comprise a material with a coefficient of thermal expansion which is substantially greater or lesser than the coefficient of thermal expansion of the fiber, where the expander is coupled to a thermal heater. Alternatively, for a magnetically tunable optical filter, the expander may be fabricated from a magnetostrictive material such as Terfenol-D™.

In another embodiment, a magnification of tuning range is accomplished by making the expander extent large compared to the grating extent, where the expander is coupled to an extent reducer, which reduces the extent of the expander to the extent of the grating. The expander is made from a first material having a coefficient of expansion for the applied control of temperature or magnetic field, and the expansion reducer is made from a second material for which its extent is substantially unchanged by the applied control. In this manner, the tuning range of the fiber grating is increased by the ratio of the extent of the expander to the extent of the grating.

DETAILED DESCRIPTION OF THE INVENTION

Figure 2:
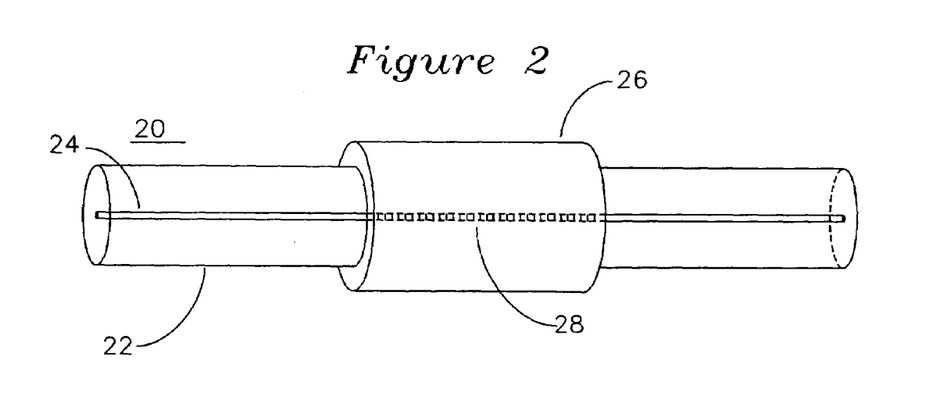
FIG. 2 shows a side view of an embodiment of the present invention.

FIG. 2 shows a fiber 22 having a core 24, and a grating 28 applied to the core. An expansion device 26 is mechanically coupled to the fiber 22 over the extent of the grating 28.

Figure 3:
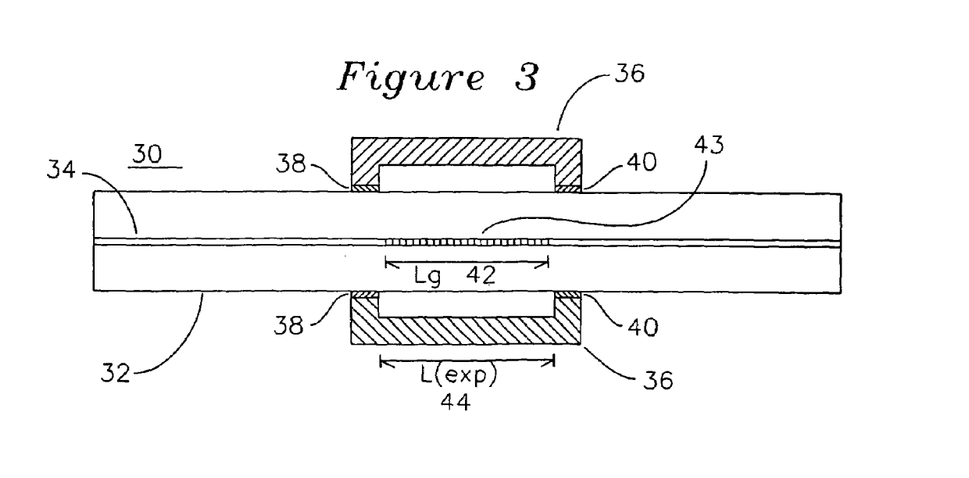
FIG. 3 shows a section view of an embodiment of a tunable filter based on FIG. 2.

FIG. 3 shows one embodiment 30 of the expansion device 26 of FIG. 2, where the grating 43 has an extent 42, and the expansion device comprises an expander 36 having a first attachment point 38 and a second attachment point 40, and the attachment points are separated by a variable extent 44. The fiber 32 is placed in tension prior to the application of an adhesive such as epoxy to secure the fiber 32 to the first and second attachment points 38 and 40, respectively. The expander 36 may be fabricated from a material with a high coefficient of thermal expansion such as aluminum with 22 ppm/° C. or zinc, with a coefficient of thermal expansion of 30 ppm/° C. Since the fiber has an intrinsic coefficient of thermal expansion of 10 ppm per ° C., it can be seen that the grating will be tunable to the extent of the difference between these two coefficients of thermal expansion, or 20 ppm per ° C. for the case of zinc.

Figure 4:
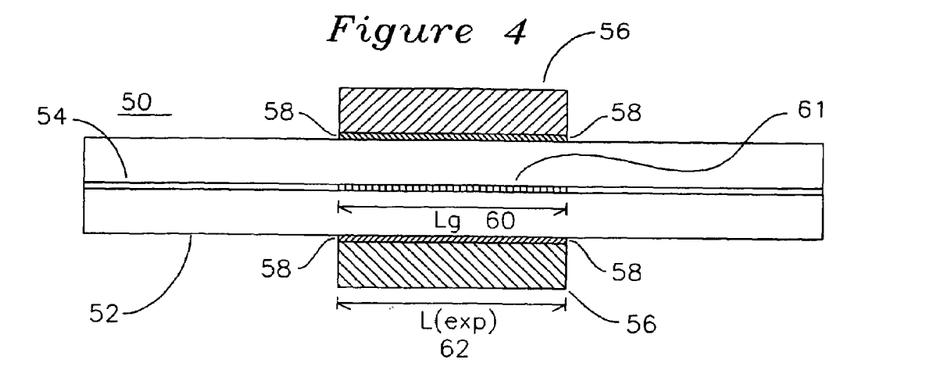
FIG. 4 shows the section view of another embodiment of the tunable filter of FIG. 2.

FIG. 4 shows another embodiment 50 where the fiber 52 has a core 54 and a grating 61 is written over an extent $L_g$ 60. The expander 56 is coupled to the fiber 52 over the entire extent 60 of the grating 61 using an adhesive such as epoxy 58, or any other material which is suitable for bonding the expander 56 to the fiber 52. As before, the fiber 52 may be placed in tension prior to applying a bonding agent 58 between the fiber 52 and expander 56. The tension applied to the fiber 52 prior to bonding to the expander 56 should be sufficient to keep the fiber 52 in tension over the entire temperature operating range of the tunable fiber device, since the wavelength tuning control relies on the presence of tension in the fiber.

Figure 5:
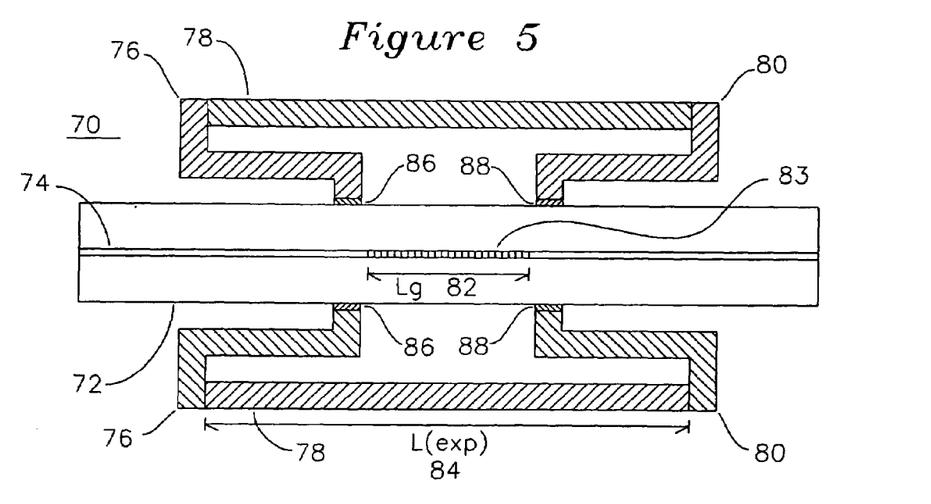
FIG. 5 shows the section view of another embodiment of the tunable filter of FIG. 2.

FIG. 5 shows another embodiment 70 for a tunable filter for a fiber 72 having a core 74 with a grating 83 where the expander 78 has an extent 84. In practice, the application of a temperature or magnetic field will cause the extent 84 to vary, as was described earlier. A first extent reducer 76 and second extent reducer 80 reduce the extent 84 of the expander 78 to a first attachment point 86 and a second attachment point 88, which are approximately the same separation as the extent 82 of the grating 83. The expander 78 is fabricated from a material which is highly sensitive to the control parameter of temperature or magnetic field, and the extent reducers 76 and 80 are fabricated from materials which are unchanged by the control parameters, or may even have an unequal and opposite value of expansion. In this manner, the change in extent of the expander 78 is applied only to the grating, and this magnifies the effect of this expansion by the ratio of the extent of the expander to the extent of the grating. For example, if the grating extent were $L_g$ with a coefficient of expansion $\alpha_g$, while the expander had an extent $L_{exp}$ with a coefficient of expansion $\alpha_{exp}$, the change in fiber pitch from a change in temperature or magnetic field influence would be:

$$\Delta g = L_{exp}(T1-T2)\alpha_{exp} - L_g(T1-T2)\alpha_g$$

where:

$\Delta g$ is the change in grating length;
$L_{exp}$ is the length or extent of the expander;
$L_g$ is the length or extent of the grating;
$(T1-T2)$ is the temperature (or magnetic field) difference;
$\alpha_{exp}$ is the coefficient of expansion for the expander;
$\alpha_g$ is the coefficient of expansion for the grating.
Then, the change in grating period would be:

$$\Delta\lambda/\lambda = \Delta g/L_g$$

such that if $K=(L_{exp}\alpha_{exp}/L_g\alpha_g)$ $$\Delta\lambda/\lambda = (K-1)\alpha_g(T1-T2)$$

It can be seen that K represents the multiplicative effect of the ratios of coefficients of expansion and ratio of extents of the expander compared to the extent of the grating. In this manner, a grating length can be chosen based on desired filter characteristic, and an extender length can be chosen based on a desired tuning range.

For the expansion devices shown in FIGS. 3, 4, and 5, it is clear to one skilled in the art of optical devices that the coefficients of expansion $\alpha_{exp}$ and $\alpha_g$ are taken to be with regard to a general environmental parameter, which may be temperature or magnetic field, and for optimal tuning range, a material having a suitable coefficient of expansion should be optimized to the control method. Tuning devices relying on thermal coefficients of expansion tend to be slow because of the latent heat of the materials used in the expander, while tuning devices which rely on magnetic field changes may have faster response times. While the descriptions of coefficient of expansion have been general, it is understood that the coefficient of expansion is related to the method of control. A material such as zinc has a coefficient of thermal expansion of 20 ppm/° C., making it suitable for thermal control, while a material such as Terfenol-D™ has a coefficient of magnetic field expansion of 1 ppm per Oersted of applied magnetic field. The details of each type of control are discussed in FIGS. 6 and 7.

Figure 6:
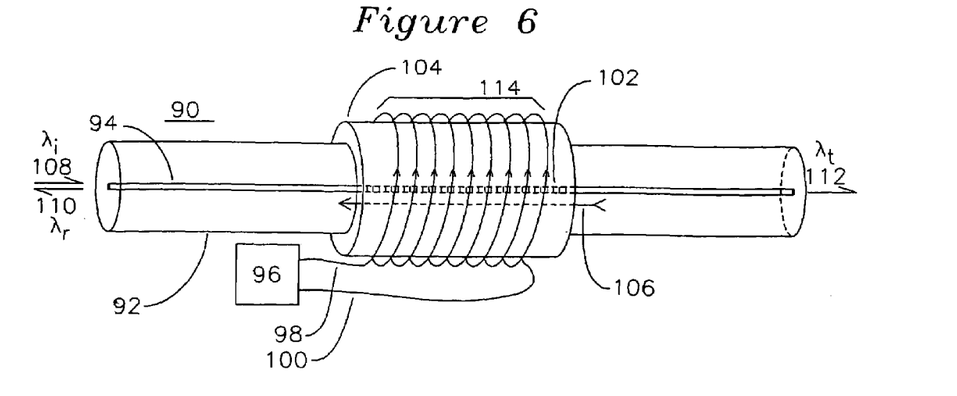
FIG. 6 shows the tunable filter where the tuning medium is a magnetically sensitive material in combination with a source of magnetic field.

FIG. 6 shows the tunable filter where the applied control is magnetic field 106. A power source 96 is coupled to a winding 114 via leads 98 and 100. The winding 114 produces a magnetic field 106, which couples to the expansion device 104, which may be any of the structures described in FIG. 3, 4, or 5, and causes a change in the extent of the expanders 36, 56, and 78, respectively. This change in extent causes the optical fiber 32 of FIG. 3, 52 of FIG. 4, and 72 of FIG. 5 to experience a change in tension, thereby changing the pitch of the gratings 43 of FIG. 3, 61 of FIG. 4, and 83 of FIG. 5. The mathematics of this change were described in detail for the case of FIG. 5, and FIGS. 4 and 3 are simple reductions of the case of FIG. 5 where $(L_{exp}/L_g)$~1, and hence $K=(\alpha_{exp}/\alpha_g)$.

Also shown in FIG. 6 is an input excitation 108, a reflected wavelength 110, and a transmitted wavelength 112. As the grating pitch is varied according to the change in expander length, the reflected wavelength 110 and transmitted wavelength 112 center wavelengths are modified.

Figure 7:
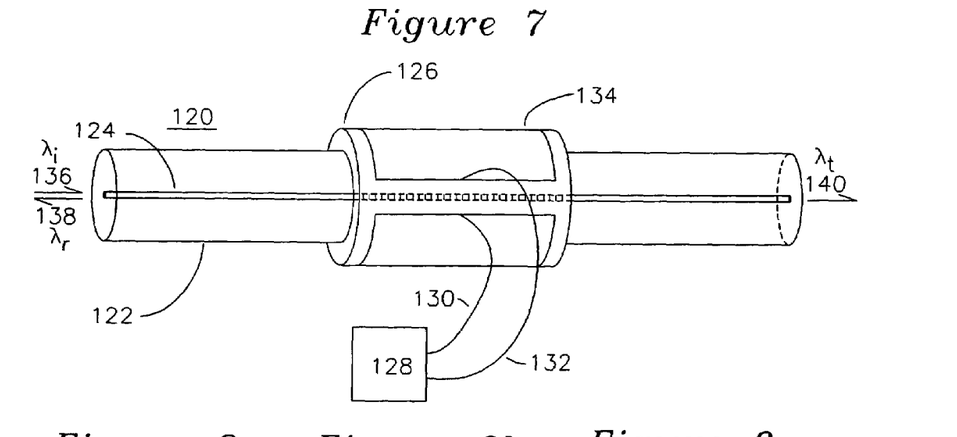
FIG. 7 shows the tunable filter where the tuning medium is a thermally sensitive material in combination with a thermal heater.

FIG. 7 shows a thermally controlled expansion device 126, where a power source 128 is coupled to a heater 134 via leads 130 and 132. The thermal energy is coupled into the expansion device 126, resulting in a change in the dimension of the expander of the expansion device, as was described in FIGS. 3, 4, and 5. An input excitation 136 results in a reflected wavelength 138, and a transmitted wavelength 140. As the grating pitch is varied according to the change in expander length, the reflected wavelength 138 and transmitted wavelength 140 center wavelengths are modified.

Figure 8A:
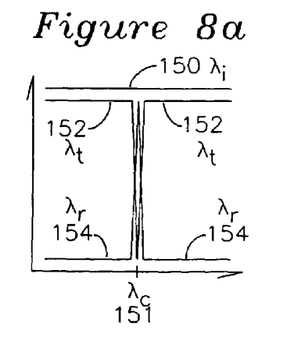
FIG. 8a shows the transmission and reflection response of a short period fiber Bragg grating.

FIG. 8a shows the tuning effect of applying the control of magnetic field in FIG. 6 or temperature in FIG. 7. At a given operating point with a fixed control, a wideband source 150 is applied as either 108 of FIG. 6 or 136 of FIG. 7. The interaction of the optical energy with the grating produces a reflected spectrum 154, corresponding to the reflected energy found at 110 of FIG. 6, or reflected energy found at 138 of FIG. 7. The spectral response of the filter is centered about a center wavelength λc 151. The remaining transmitted energy 152 of FIG. 8a corresponds to the output wave energy 112 of FIG. 6 or 140 of FIG. 7. These figures reflect the characteristics of short-period gratings, for which the behavior is reflection of optical energy at a wavelength associated with the grating, as is known to one skilled in the art. For long period gratings, the behavior is the opposite—most of the energy is reflected, and a narrow band of energy is transmitted through the gratings. Either type of grating is suitable for the embodiments of FIGS. 3, 4, and 5, and it is clear to one skilled in the art that the tuning mechanism is identical, however the characteristics of these two types of filters is different.

Figure 8B:
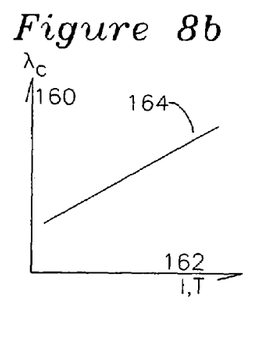
FIG. 8b shows the tuning characteristics for an expander having a positive expansion coefficient.

FIG. 8b shows the center wavelength tunability with an external control, where the coefficients of expansion have positive characteristics, such as zinc for thermal control, or Terfenol™ for magnetic control using a magnetostrictive material. In this example, the application of an increasing control 162 produces a longer grating, resulting in a longer center wavelength 160, as shown by the curve 164.

Figure 8C:
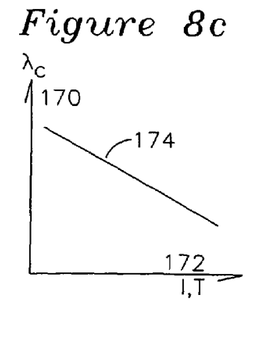
FIG. 8c shows the tuning characteristics for an expander having a negative expansion coefficient.

FIG. 8c shows the center wavelength tunability with an external control, where the coefficients of expansion have negative characteristics, such as zinc for thermal control, or Terfenol™ for magnetic control. In this example, the application of an increasing control 172 produces a shorter grating, resulting in a shorter center wavelength 170, as shown by the curve 174.

The figures and descriptions are shown for illustration only, to enable the reader to understand the invention in a particular form, for the purposes of describing a specific implementation, and are not intended to restrict the invention to only those implementations described in the figures. For example, the structures of FIGS. 3, 4, and 5 are shown as a cross section view of circularly symmetric cylinder of FIG. 2, however it is clear that it is possible to construct the structures of FIGS. 3, 4, and 5 as half-cylinders, or as rectangular solids, or any shape which couples a large change of extent over a short change of extent. The Bragg gratings may be short period or long period as known in the prior art, and may be written on the fiber core or fiber cladding, in accordance with the prior art of fiber Bragg gratings. While the examples shown are for controlling the tuning of the grating using an externally applied magnetic field or thermal source, the implementations may also be used to form a sensor, where the ambient environment contains a temperature or magnetic field which is measured by the device shown. For use as a magnetic field sensor, the implementations of FIGS. 3, 4, and 5 would be used, without the external magnetic field generator 114, or power source 96 shown in FIG. 6. For use as a temperature sensor, the implementations of FIGS. 3, 4, and 5 would be used, without the power source 128 and heater 134 shown in FIG. 7. In this manner, a sensor for magnetic or temperature could be realized.

Figure 9:
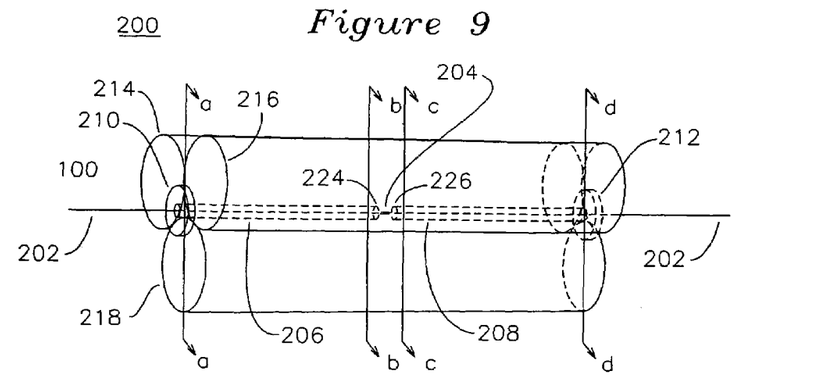
FIG. 9 shows a view of a tunable filter using three magnetostrictive rods.

FIG. 9 shows an additional embodiment of the geometry described in FIG. 5. Tunable filter 200 comprises three equal length expander rods 214, 216, and 218, each rod having a first end and a second end opposed to the first end. The expander rods may be made from a magnetostrictive material such as Terfenol™, as described earlier. A fiber 202 having a grating 204 is threaded through a first tube 206 and a second tube 208, and the fiber is bonded to the tube at the tube/fiber interface 224 and 226. The tube and fiber assembly include end stops 210 and 212 which are bonded to the tubes 206 and 208, respectively. The end stops 210 and 212 are in contact with first and second ends of the three magnetostrictive rods 214, 216, and 218.

Figure 10:
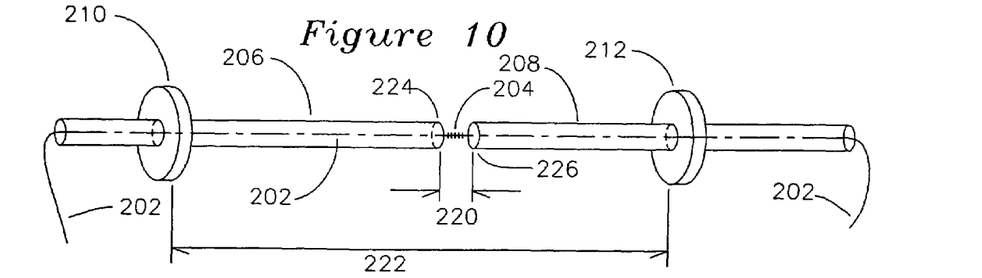
FIG. 10 shows a detail of the extent reducers of FIG. 9.

FIG. 10 shows the detail of the fiber 202, grating 204, first bonding 224 to first tube 206, first end stop 210, second bonding 226 to second tube 208, and second end stop 212. The tubes 206 and 208 may continue beyond the end stops 210 and 212, respectively. Grating extent 220 and expander extent 222 operate as was described in the earlier FIG. 5. When a control field or temperature is applied to the expanders 214, 216, 218, they uniformly expand in length 222, since the expanders 214, 216, and 218 are bonded to the end stops 210 and 212. The rods 206 and 208 are not connected to the expander at any points other than the end stops 210 and 212, and the rods are fabricated from a material which is not influenced by the control applied to the expander rods 214, 216, 218. In this manner, the expanders 214, 216, 218 change length 222, which is translated to the grating extent 220, thereby causing a large change in expander length to be entirely applied to the grating 204.

Figure 11:
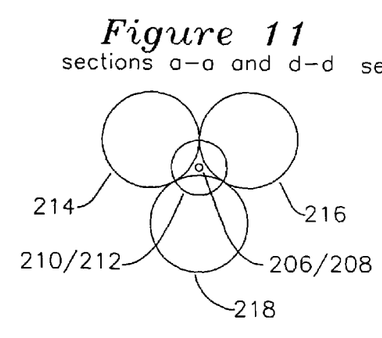
FIG. 11 is a cross section detail of FIG. 9.

FIG. 11 shows the section a—a and d—d through the end stops shown on FIG. 9. Expanders 214, 216, and 218 are in contact with first stop 210 and first rod 206 in section a—a, and with second stop 212 and second rod 208 in section d—d of FIG. 9.

Figure 12:
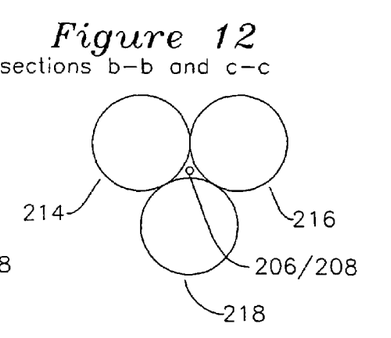
FIG. 12 is a cross section detail of FIG. 9.

FIG. 12 shows the sections b—b and c—c through the expanders 214, 216, 218 and the first rod 206 which is bonded to fiber 202 on one end of the grating 204 for section b—b, and the second rod 208 which is bonded to fiber 202 on the other end of the grating 204 for section c—c of FIG. 9. From the principles of the invention, there is no bonding contact between the fiber tube 208 and expander rods 214, 216, 218 at any points other than the ends of the expander rods where they are affixed with end stops 210 and 212.

It is clear to one skilled in the art of tunable filters that it is possible to use many different shapes and numbers of expanders 214, 216, 218 beyond the use of 3 rods as shown, and FIGS. 9 through 12 show just one alternate method of realizing the expander shown in FIG. 5, which similarly comprises an expander and a translator coupled to a grating.

In FIG. 9, it is also possible to bond the ends of the expanders to the fiber tubes 206 and 208 at the end stops 210 and 212 in may different ways than shown. Directly bonding the fiber tubes 206 and 208 to the expander first end and expander second end is also possible, and this bonding may be done with epoxy, a mechanical bond, or any other means of bonding the fiber tube to the expander end.

It is believed that the best mode of FIG. 9 includes bonding the fiber 202 exclusively at the fiber rods 206, 208 adjacent to the grating 204, rather than filling the fiber rods 206 and 208 with epoxy beyond the bonding points 224 and 226.

For each of the attachments of expanders to expansion reducers 76 and 80, as in FIG. 5, or rods 206 and 208, there are many forms of bonding known in the art for making these attachments. Available bonding methods include the use of epoxies and welding agents, as well as any other bonding method known. Another bonding type is mechanical bonding, as where the fiber 202 of FIG. 9 is in tension, and the end stops 212 and 210 have extents which are within the extent of the ends of the expander rods 214, 216, 218, thereby securing the end stops 212 and 210 to the expanders 214, 216, 218 through the use of the holding tension of the fiber 202.

The use of materials for the expanders (56 of FIG. 4, 78 of FIG. 5, 214, 216, 218 of FIG. 9) and expansion reducers (76 and 80 of FIGS. 5, 206 and 208 of FIG. 9) requires that the effect of the expanders not be reduced by the extent of the expansion reducers. For example, if the expanders and expansion reducers were made from materials having similar coefficients of expansion, the expander and expansion reducers would largely cancel each other out. It is preferred to use an expander and expansion reducer where the ratio of coefficients of expansion for the expander to the expansion reducer is greater than 2.

We claim:

1. A tunable optical filter comprising: an expander having an expander extent, a coefficient of expansion, a first attachment, and a second attachment, said attachments separated by an attachment extent;
   an optical fiber having a grating, said grating having a grating extent;
   said expander positioned around said optical fiber, and said optical fiber grating extent includes at least part of said attachment extent;
   said expander bonded to said optical fiber only at said first attachment and said second attachment and not bonded over said attachment extent;
   said expander responsive to a control.

2. The tunable filter of claim 1 where said control is a varying magnetic field.

3. The tunable filter of claim 2 where said tunable filter includes a magnetic field generator producing a magnetic field which is coupled to said expander.

4. The tunable filter of claim 3 where said magnetic field generator comprises an coil wound about said expander.

5. The tunable filter of claim 1 where said control is a varying temperature.

6. The tunable filter of claim 5 where said tunable filter includes a heating device coupled to said expander.

7. The tunable filter of claim 1 where said filter is sensing a temperature, and said control comprises the temperature to be sensed.

8. The tunable filter of claim 1 where said control comprises a magnetic field to be sensed and said grating is used to measure said magnetic field.

9. The tunable filter of claim 1 where said expander is made from $Tb_{0.3}Dy_{0.7}Fe_{1.9}$.

10. The tunable filter of claim 1 where said expander is made from zinc.

* * * * *